United States Patent

[11] 3,602,535

| [72] | Inventors | William E. Behning;<br>Cyril M. Hawkins, both of Indianapolis, Ind. |
|---|---|---|
| [21] | Appl. No. | 37,091 |
| [22] | Filed | May 14, 1970 |
| [45] | Patented | Aug. 31, 9171 |
| [73] | Assignee | General Motors Corporation<br>Detroit, Mich. |

[54] SHAFT COUPLING
6 Claims, 2 Drawing Figs.

[52] U.S. Cl. .................................................. 287/53,
64/9
[51] Int. Cl. .................................................. F16d 1/06
[50] Field of Search .......................................... 287/53 R,
52; 64/9 R

[56] References Cited
UNITED STATES PATENTS

| 2,738,125 | 3/1956 | Ledwith .................... | 287/53 R X |
| 3,449,926 | 6/1969 | Hawkins .................... | 287/53 R X |
| 3,343,854 | 9/1967 | Dennison .................... | 287/53 R |

FOREIGN PATENTS

| 770,683 | 3/1957 | Great Britain ................ | 64/9 |

*Primary Examiner*—David J. Williamowsky
*Assistant Examiner*—Andrew V. Kundrat
*Attorneys*—Jean L. Carpenter and Arthur N. Krein

ABSTRACT: An axially adjustable coupling between telescoping, splined together compressor and turbine shafts of a gas turbine engine which includes a coupling threaded to both the compressor shaft and to the turbine shaft and a lock coupling splined to the coupling and normally biased into splined engagement with the compressor shaft.

INVENTORS.
William E. Behning &
BY Cyril M. Hawkins

Arthur N. Krein
ATTORNEY

INVENTORS
William E. Behning &
BY Cyril M. Hawkins

Arthur N. Krein
ATTORNEY

SHAFT COUPLING

The invention herein described was made in the course of work under a contract or subcontract thereunder with the Department of Defense.

This invention relates to a shaft coupling and, particularly, to a shaft coupling for coupling together the hollow compressor and turbine shafts of a gas turbine engine by means of a coupling and lock coupling which are suitably positioned by a special tool which can only be removed if the coupling is properly secured to both the compressor shaft and turbine shaft.

This invention has particular applicability to gas turbine engines in which it is desirable to couple a turbine shaft to the shaft of a compressor driven by the turbine and in which axial adjustment of the position of the turbine with respect to the compressor is required. It is important that the adjustment be preserved and that the coupling be unable to change position, particularly, if such change might result in release of the thrust connection between these shafts. This invention provides a safe, secure coupling which prevents any relative rotation of the coupling with respect to either shaft after it is in locked position and which is readily adjustable by a tool inserted through one shaft to permit locking or unlocking of the compressor shaft with respect to the turbine shaft, as desired. A safety interlock is provided such that the tool cannot be removed after the coupling has been adjusted unless the lock coupling has properly been positioned with respect to the compressor shaft. This provides an important safety factor making it impossible for a mechanic to inadvertently fail to leave the lock coupling and coupling in a proper operating position.

Accordingly, the principal object of this invention is to provide an improved shaft coupling whereby an axially adjustable connection can be effected between coaxial shafts which connection is failsafe against misadjustment.

Another object of this invention is to provide an improved shaft coupling for use in coupling the compressor and turbine shafts of a gas turbine engine whereby a special tool is required to effect connection of the coupling with the compressor and turbine shafts through the use of a coupling and a lock coupling cooperating with each other in such a manner that the special tool cannot be removed unless the compressor and turbine shafts are properly connected in operating position with respect to each other.

These and other objects of the invention are obtained by means of an adjustable shaft coupling which includes a tubular coupling with external threads at opposite ends thereof adapted to threadingly engage internal threads on both the compressor shaft and turbine shaft to retain the shafts in engaged relationship with each other. The coupling is threaded to these shafts and held in locked position thereto by a tubular lock coupling spline connected to the coupling and normally biased into splined engagement with the compressor shaft. Inwardly radially extending flanges on both the coupling and lock coupling are provided with notches of a predetermined width and depth to permit a special tool to engage these devices to effect the locking of the turbine shaft to the compressor. The configuration of these notches is such that a special tool can engage the lock coupling to effect rotation of it and the coupling while preventing withdrawal of the special tool unless the lock coupling is properly positioned with respect to one of the shafts to permit removal of the special tool.

For a better understanding of the invention, as well as other objects and further features thereof, reference is had to the following detailed description of the invention to be read in connection with the accompanying drawings, wherein.

Figure 1:
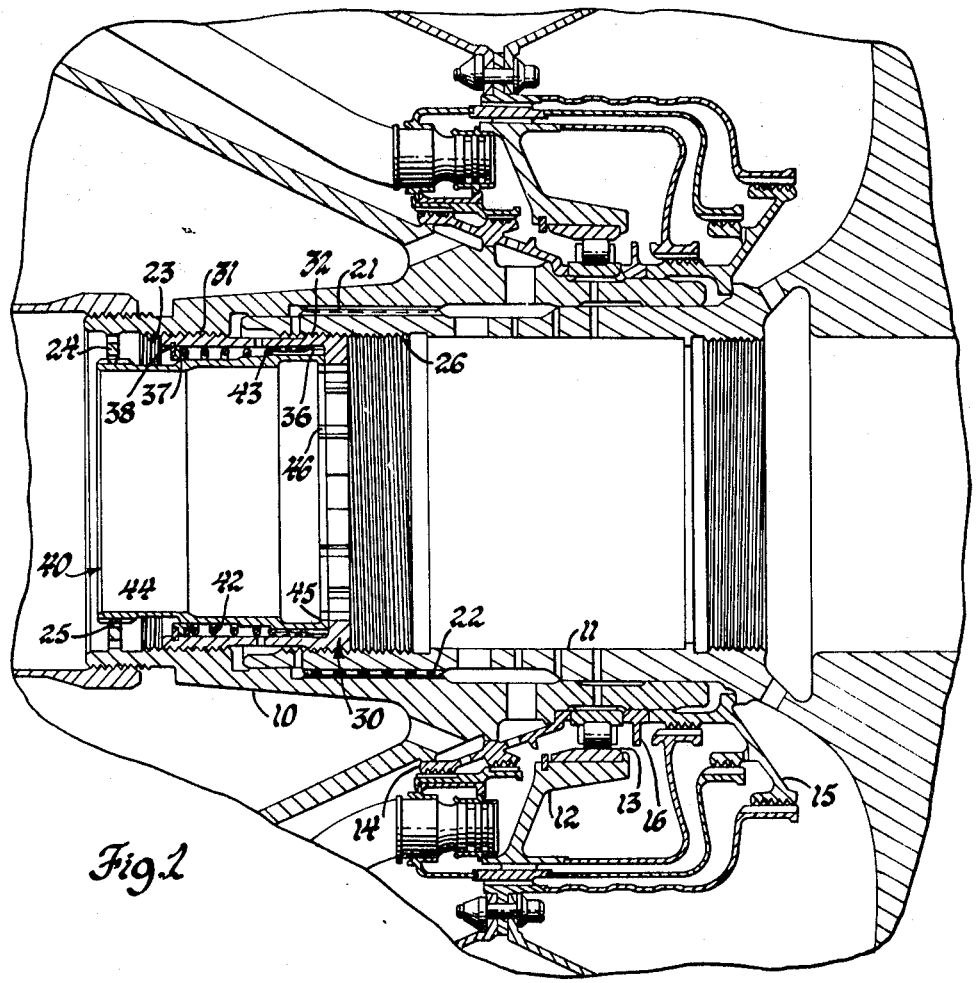
FIG. 1 is a partial view of a gas turbine engine taken on a plane containing the axis of rotation of the shafts and with the shafts, coupled together in accordance with the invention.

Referring to the drawings, a compressor stub shaft 10 of the gas turbine engine is coupled to the forward end of a turbine shaft 11. The compressor stub shaft is supported by a fixed support 12 in the engine and a bearing 13. Labyrinth seal rings 14 and 15 on the compressor stub shaft 10 are positioned to cooperate with the fixed structure of the engine to minimize leakage. The seal rings 14 and 15 are positioned on opposite sides of the inner race of bearing 13 with a slinger 16 positioned between bearing 13 and the seal ring 15. Other elements of the turbine structure shown, are not described in detail since they form no part of the subject invention.

Figure 2:
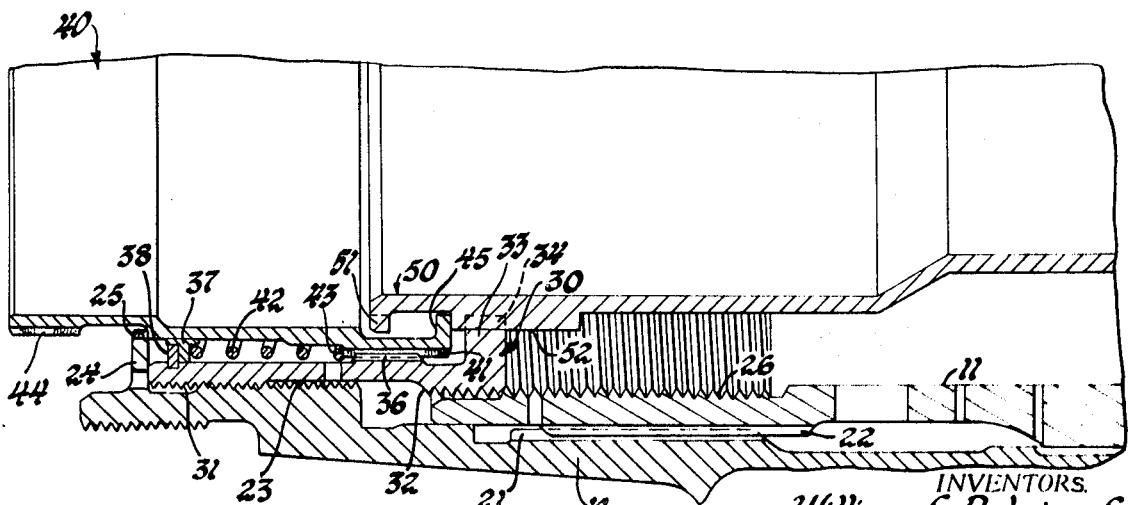
FIG. 2 is a partial enlarged view of FIG. 1 showing the compressor shaft and turbine shaft in position for coupling with the adjusting wrench in position to effect coupling.
Figure 3:
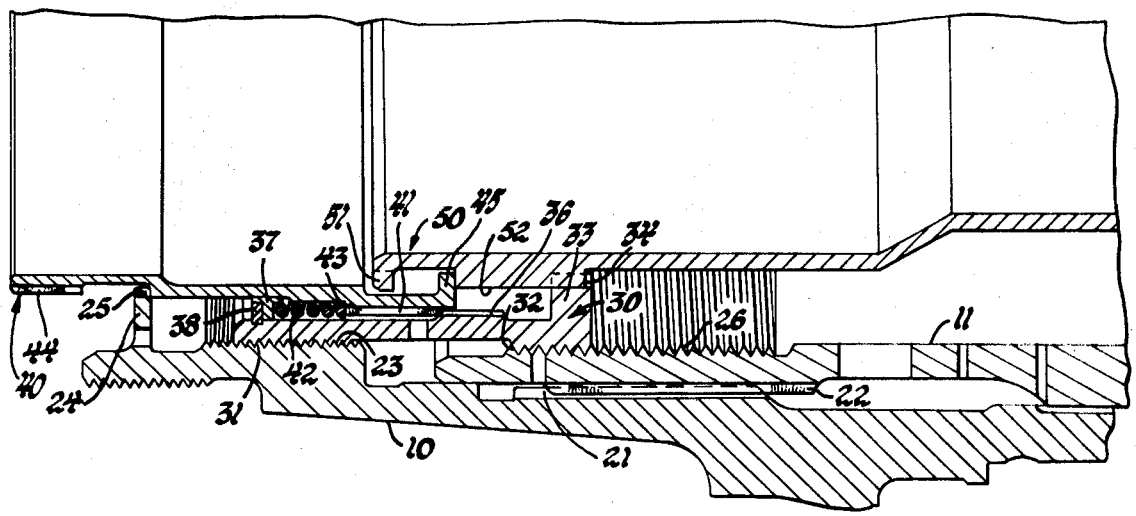
FIG. 3 is a view similar to FIG. 2, but with the compressor shaft and turbine shaft partially coupled together with the wrench still in position.
Figure 5:
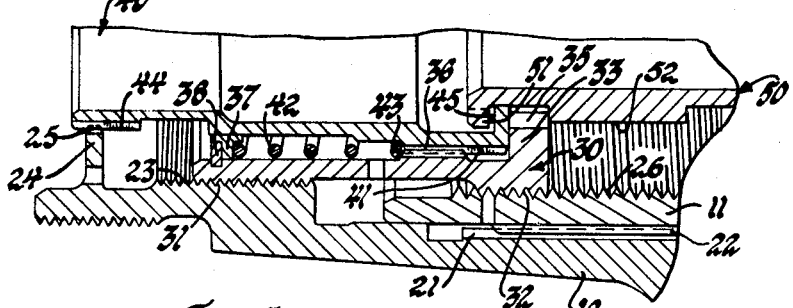

As shown in FIGS. 1, 2 and 3, the compressor stub shaft 10, which is hollow, is provided with internal splines 21 which cooperate with the external splines 22 of the turbine shaft 11 to nonrotatively lock these two units together with respect to each other, the external diameter of the turbine shaft being such as to be slideably received within the compressor shaft 10. At one end, the left-hand end as seen in FIGS. 1, 2 and 3, the compressor shaft is provided with internal threads 23 and an outboard thereof is provided with an internal flange 24 with splines 25 at the periphery. The turbine shaft, also of hollow configuration, is provided at one end, the left end as seen in these drawings, with internal threads 26.

Figure 4:
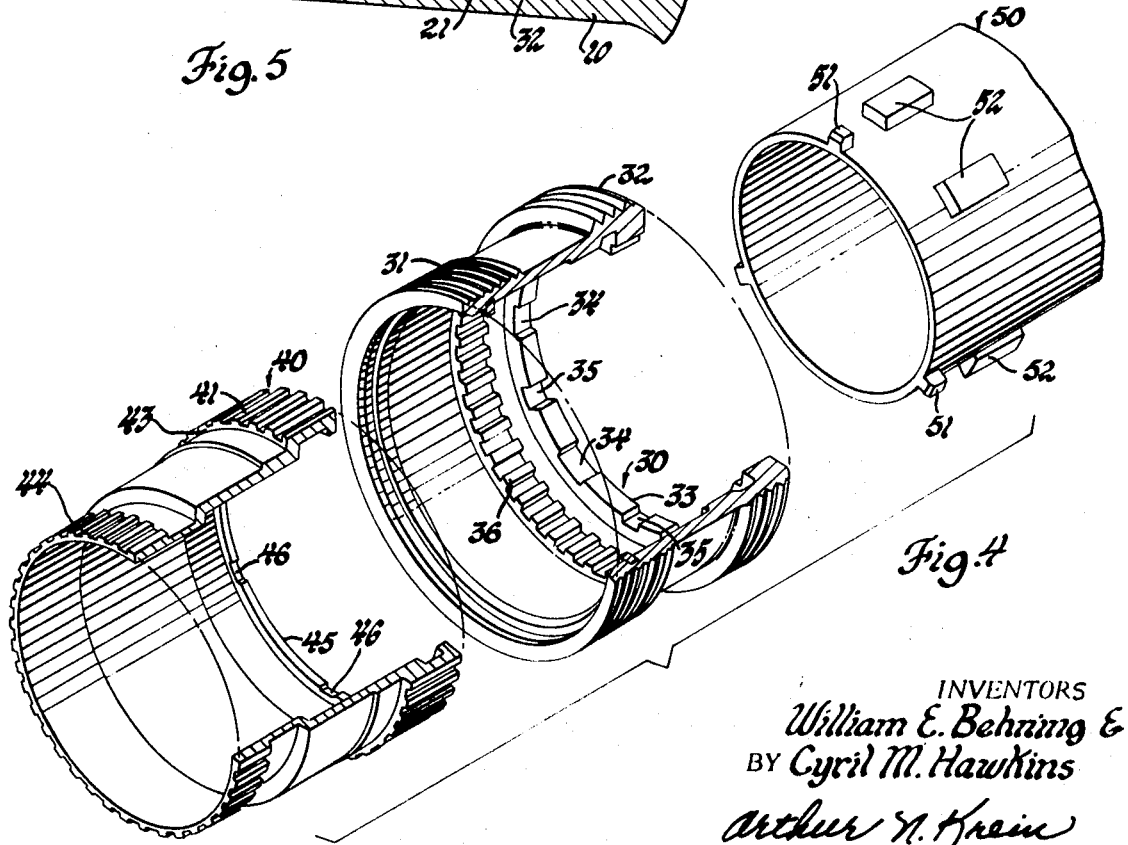
FIG. 4 is an exploded axonometric view showing the major parts of the coupling arrangement and the special adjusting wrench used therewith; and, FIG. 5 is a sectional view of the coupling parts and wrench of FIG. 4.

The coupling 30, in the form of an internal tubular nut, is provided at opposite ends thereof with external threads 31 and 32 adapted to engage the threads 23 on compressor shaft 10 and threads 26 on turbine shaft 11, respectively. Thread sets 31, 23 and 32, 26 are of different pitch with respect to each other to provide for relative axial movement during rotation of coupling 30. At its right-hand end, as seen in these figures, the coupling is provided with an internal flange 33 having, in the embodiment shown, a set of six equally spaced wide notches 34 and, in between these, a second set of narrow notches 35, the depth of the narrow notches being greater than the depth of the wide notches. The coupling 30 is slideably keyed to a lock coupling 40. As shown, the coupling 30 is provided intermediate its ends with internal splines 36 adapted to cooperate with the external splines 41 of the lock coupling 40 which is slideably received within the coupling 30 and which is normally biased to the right, to the positions shown in FIG. 1 by a spring 42 encircling the lock coupling 40. The spring 42 abuts at one end against an external shoulder 43 adjacent to the splines 41 and at its other end, the spring abuts against a T-shaped annular retainer 37 secured against axial movement to the left, as seen in FIG. 1, by an annular split ring retainer 38 suitably positioned within an annular groove formed in the coupling 30 for this purpose. In turn, the T-shaped annular retainer 37 also traps the annular split-ring retainer 38 to prevent it from becoming disengaged out of the annular groove in coupling 30. As shown in FIG. 1, the spring 42 normally biases the lock coupling 40 to the right so that the external splines 44 at the left end of the lock coupling are in engagement with the splines 25 of compressor shaft 10. As best seen in FIG. 4, the lock coupling is provided at its right-hand end adjacent to splines 41 with an internal flange 45 provided with six narrow notches 46 conforming in configuration to the narrow notches 35 in coupling 30.

In assembling the compressor shaft and turbine shaft, the lock coupling 40 and the coupling 30 are assembled together by the splines so that the narrow notches 35 on the coupling 30 are in alignment with the narrow notches 46 of the lock coupling 40, with the spring 42 installed as shown. The coupling 30 is then threaded onto the compressor shaft 10 to the position shown in FIG. 2. The turbine and compressor shafts are then positioned together as shown in FIG. 2.

To adjust the coupling 30 to the position shown in FIGS. 1 and 3 to effectively interlock the compressor and turbine shafts together, the adjusting wrench 50 is inserted through the hollow turbine shaft until it touches the coupling 30 and then it is rotated as necessary so that the three narrow lugs 51 at the front outer periphery thereof are lined up with three of the narrow notches 35 on the coupling 30. The wrench is then pushed through the coupling 30 and lock coupling 40, which can be done since the narrow notches 46 in the lock coupling are in alignment with the narrow notches 35 of coupling 30, until stopped by contact of the wide lugs 52 on the adjusting wrench with the narrow notches 35 of the coupling 30. The spacing between the narrow lugs 51 and the wide lugs 52 on the adjusting wrench 50 and the dimensions of the internal flanges 33 and 45 of the coupling 30 and lock coupling 40, respectively, is such that when this occurs, the narrow lugs 51 of the wrench 50 will have cleared the internal flange 45 of the lock coupling 40, as seen in FIG. 4 permitting further rotation of the adjusting wrench 50 to line up the wide lugs 52 with the wide notches 34 in coupling 30. The adjusting wrench is then pushed in, to he left as seen in FIGS. 2 and 3, to the position shown in these figures so that the wide lugs 52 now contact the internal flange 45 of lock coupling 40.

Since there are no wide slots in the internal flange 45 of lock coupling 40, pushing the adjusting wrench further to the left as seen in these figures, causes sliding of the lock coupling along its splines 41 by compressing the spring 42 until the splines 44 connecting the lock coupling 40 with the splines 25 of the compressor shaft are disengaged, as shown in FIGS. 2 and 3. As long as sufficient axial force is applied to the adjusting wrench 50 to keep the spring 42 from sliding the lock coupling splines 44 back into engagement with the compressor shaft, the adjusting wrench can be turned to adjust the coupling 30 as desired. As seen in FIGS. 2 and 3, the wide lugs 52 are of sufficient length to permit full compression of spring 42 without having these lugs becoming disengaged from the wide notches 34 in flange 33.

Upon completion of the adjustment, that is, threading coupling 30 onto the turbine shaft 11 to the position shown in FIGS. 1 and 3, release of axial pressure on the adjusting wrench will allow the spring 42 to slide the lock coupling splines 44 toward engagement with the mating splines 25 on the compressor shaft. If these splines are aligned well enough to permit an engagement, the spring will slide the lock coupling 40 back against the coupling 30 with the internal flange 45 of lock coupling 40 adjacent to the internal flange 33 of coupling 30 and it will then be possible to withdraw the adjusting wrench by the reverse of the insertion procedure, previously described. The wide lugs 52 of the adjusting wrench can then be rotated until the narrow lugs 51 thereon line up with the narrow notches 46 of the lock coupling and the narrow notches 35 of the coupling to permit withdrawal of the adjusting wrench.

If, however, the splines 44 of the lock coupling 40 and splines 25 of the compressor shaft 10 are not in position to mesh after completion of the adjustment, the spring 42 will not be able to slide the lock coupling fully back against the coupling 30. This will prevent the wide lugs 52 of the adjusting wrench from clearing the wide notches 34 in the internal flange 33 so that it will be impossible to turn the adjusting wrench to align the narrow lugs 51 of the adjusting wrench with the narrow notches in both the lock coupling and the coupling which is necessary to withdraw the adjusting wrench.

It will then be necessary to readjust the coupling 30 slightly until the splines 44 and 25 line up as required to permit engagement. This slight movement of the coupling will be too small to detrimentally affect the adjustment of the turbine shaft in relation to the compressor shaft. The adjusting wrench 50 may also be used as an aid in pulling lock coupling 40 into its locked position.

The detailed description of the preferred embodiment of this invention for the purpose of explaining the principles thereof is not to be considered as limiting or restricting the invention, as many modifications may be made by the exercise of skill in the art without departing from the scope of the invention.

What is claimed is:

1. A coupling arrangement comprising, in combination, a first threaded member, a second threaded member telescoped over a portion of said first threaded member, spline means on said first member and on said second member nonrotatively coupling said first member and said second member together, a coupling threaded to said first member and to said second member, a lock coupling slideably and nonrotatively mounted on said coupling, spline means on said lock coupling and on said first member adapted for engagement to nonrotatively lock said lock coupling to said first member and spring means normally biasing said lock coupling into engagement with said first member.

2. A coupling arrangement according to claim 1 wherein said coupling includes a spline slideably engaged with splines on said lock coupling.

3. A coupling arrangement according to claim 1 wherein said coupling includes a flange having spaced-apart wide notches and narrow notches therein and, wherein said lock coupling includes a flange provided with spaced-apart narrow notches therein, the narrow notches in said coupling being aligned with said narrow notches in said lock coupling.

4. A coupling arrangement according to claim 3 in combination with a wrench having a first set of lugs adapted to be insertable through said narrow notches of said coupling and said lock coupling and a second set of lugs spaced from said first set of lugs a distance greater than the combined width of said flanges of said coupling and said lock coupling, said second set of said lugs being adapted to be engageable in said wide notches of said coupling.

5. An axially adjustable shaft coupling comprising, in combination, a first hollow internally threaded shaft telescoped within said first shaft, spline means on said first shaft and said second shaft nonrotatively coupling said first shaft to said second shaft, a tubular coupling internally threaded to said first shaft and to said second shaft, a tubular lock coupling telescoped within said coupling, spline means on said coupling and said lock coupling nonrotatively joining said coupling and lock coupling together, spline means on said lock coupling and on said first shaft adapted for nonrotatively joining said lock coupling to said first shaft, and spring means normally biasing said lock coupling whereby said spline means on said lock coupling and on said first shaft are engaged.

6. The axially adjustable shaft coupling of claim 5 wherein said coupling includes an internal flange with a set of wide notches and a set of narrow notches therein and wherein said lock coupling includes an internal flange provided with a set of narrow notches therein, the narrow notches in said coupling being aligned with said narrow notches in said lock coupling.

PO-1050
(5/69)

UNITED STATES PATENT OFFICE
CERTIFICATE OF CORRECTION

Patent No. 3,602,535          Dated November 5, 1971

Inventor(s) William E. Behning and Cyril M. Hawkins

It is certified that error appears in the above-identified patent and that said Letters Patent are hereby corrected as shown below:

On the first page following the drawings, "/45_7 Patented Aug. 31, 9171" should read --/45_7 Patented Aug. 31, 1971--;
Column 3, line 21, "he" should read --the--; and,
         line 50, after "wrench", insert --will be then clear of the internal flange 33 of the coupling 30 so that the adjusting wrench--;
Column 4, line 45, after "shaft", insert --, a second hollow internally threaded shaft--.

Signed and sealed this 21st day of March 1972.

(SEAL)
Attest:

EDWARD M. FLETCHER, JR.          ROBERT GOTTSCHALK
Attesting Officer          Commissioner of Patents